United States Patent
Kulkarni et al.

(10) Patent No.: US 8,909,770 B2
(45) Date of Patent: Dec. 9, 2014

(54) PERFORMANCE ESTIMATOR FOR NETWORK DEVICES

(75) Inventors: Milind Kulkarni, San Jose, CA (US); Xin Luo, Fremont, CA (US); Mani Kancherla, Milpitas, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 174 days.

(21) Appl. No.: 13/538,747

(22) Filed: Jun. 29, 2012

(65) Prior Publication Data

US 2013/0326054 A1 Dec. 5, 2013

Related U.S. Application Data

(60) Provisional application No. 61/655,130, filed on Jun. 4, 2012.

(51) Int. Cl.
*G06F 15/173* (2006.01)
*H04L 29/08* (2006.01)
*H04L 12/931* (2013.01)
*H04L 12/24* (2006.01)

(52) U.S. Cl.
CPC ........... *H04L 29/0899* (2013.01); *H04L 49/35* (2013.01); *H04L 41/147* (2013.01)
USPC ........................................................ 709/224

(58) Field of Classification Search
CPC . H04L 12/4641; H04L 45/00; H04L 63/0227; G06F 15/173
USPC ........................................................ 709/224
See application file for complete search history.

(56) References Cited

U.S. PATENT DOCUMENTS

| | | | | |
|---|---|---|---|---|
| 6,717,913 B1 * | 4/2004 | Ghahremani et al. | ........ | 370/230 |
| 7,197,315 B1 * | 3/2007 | Stephens et al. | ............ | 455/450 |
| 7,269,654 B2 * | 9/2007 | Srinivas | ....................... | 709/227 |
| 7,975,190 B2 * | 7/2011 | Smith et al. | .................... | 714/708 |
| 2007/0271375 A1 * | 11/2007 | Hwang | ........................ | 709/224 |
| 2010/0195659 A1 * | 8/2010 | Karaoguz et al. | ............. | 370/400 |
| 2010/0260186 A1 * | 10/2010 | Hua et al. | ...................... | 370/394 |
| 2011/0113405 A1 * | 5/2011 | Guerrera et al. | .............. | 717/125 |

OTHER PUBLICATIONS f5-networks O2 Networks Product Brochure (by F5 Networks, Inc., Oct. 2011).*
F5 iRule-101 (https://devcentral.f5.com/articles/irules-101-01-introduction-to-irules, Nov. 1, 2007).*

* cited by examiner

*Primary Examiner* — Kevin Bates
*Assistant Examiner* — Chen-Liang Huang
(74) *Attorney, Agent, or Firm* — Fountainhead Law Group PC (57) ABSTRACT

Techniques for estimating the performance of a network device. In one set of embodiments, a network device can determine one or more performance metrics associated with a feature of the network device that is customizable by a user. An example of such a feature is a user-defined script that is executed via a scripting engine of the network device. The network device can then generate a performance estimate based on the one or more performance metrics. The performance estimate can indicate the likely performance of the network device with the feature enabled.

18 Claims, 8 Drawing Sheets

```
# Performs server selection based on URI in HTTP
# Request Header

# Tell the script about extensions used in this program
USE OS_HTTP_REQUEST;
USE OS_SLB;

# Define an event handler to be called when an HTTP
# request is received
SUB HTTP_REQUEST
{
    # Get an HTTP request object to manage
    # request headers or content.
    $REQUEST = OS_HTTP_REQUEST::GET;

# Pattern we want to match......
    $URL_PATTERN = "INDEX.HTML";
    # .... with pattern data in packet
    $URL_IN_REQUEST = $REQUEST->URL;

# Perform a Regular Expression Search.
    # Form is haystack =~ match/needle/
    IF ($URL_IN_REQUEST =~ M/$URI_PATTERN/) {
        # Forward to a real server identified by name
        OS_SLB::FORWARD("RS1");
    } ELSE {
        # Forward to a server identified by numeric ID
        OS_SLB::FORWARD(2);
    }
}
```

PERFORMANCE ESTIMATOR FOR NETWORK DEVICES

CROSS-REFERENCES TO RELATED APPLICATIONS

The present application claims the benefit and priority under 35 U.S.C. 119(e) of U.S. Provisional Application No. 61/655,130, filed Jun. 4, 2012, entitled "PERFORMANCE ESTIMATOR FOR NETWORK DEVICES," the entire contents of which are incorporated herein by reference for all purposes.

BACKGROUND

The present disclosure relates in general to networking, and in particular to techniques for estimating the performance of network devices.

Network devices, such as switches, routers, and the like, typically provide a variety of features that can be configured by users to control the functionality and operation of the devices. For example, with respect to a Layer 2 switch, such features can include VLAN setup, port security (e.g., MAC filtering, etc.), and so on. With respect to a Layer 4 through 7 switch (also known as an application delivery switch or controller), such features can include Layer 4 through 7 redirection, server load balancing, network address translation, and so on.

In some cases, the configurability of these features is limited to a set of predefined rules or policies that are built into the device software and/or hardware. In other cases, this configurability can be more flexible and open-ended. For example, certain types of application delivery switches (such as the ServerIron ADX line of switches developed by Brocade Communications Systems, Inc.) implement a scripting engine that is capable of manipulating data traffic in real-time based on user-defined scripts. With such scripting functionality, users can flexibly define and implement whatever business logic they need to control application delivery, without being restricted to the specific configuration options and rule sets implemented by the switch vendor.

Unfortunately, device configurability generally comes at the cost of performance and scalability. This is particularly true for very flexible and customizable mechanisms, such as the scripting functionality noted above. For instance, an application delivery switch that executes a user-defined script can, depending on the script's complexity, potentially experience a very severe degradation in performance due to script execution overhead. This can pose significant issues in mission-critical network environments.

SUMMARY

Embodiments of the present invention provide techniques for estimating the performance of a network device. In one set of embodiments, a network device can determine one or more performance metrics associated with a feature of the network device that is customizable by a user. The network device can then generate a performance estimate based on the one or more performance metrics, the performance estimate indicating the likely performance of the network device with the feature enabled.

In one embodiment, the feature can be a user-defined script that is executed via a scripting engine of the network device.

In one embodiment, determining the one or more performance metrics and generating the performance estimate can be performed at a time of compiling the user-defined script on the network device.

In one embodiment, the one or more performance metrics can include a performance overhead value for a packet processing engine of the network device.

In one embodiment, the one or more performance metrics can further include a performance overhead value for each of a plurality of event handlers and a performance overhead value for each of a plurality of application programming interfaces (APIs).

In one embodiment, generating the performance estimate can include identifying one or more event handlers in the plurality of event handlers that are included in the user-defined script; identifying one or more APIs in the plurality of APIs that are invoked in the user-defined script; and generating an aggregated performance metric for the user-defined script by aggregating the performance overhead value for the packet processing engine, the performance overhead values for each of the one or more event handlers, and the performance overhead values for each of the one or more APIs.

In one embodiment, generating the performance estimate can further include converting the aggregated performance metric into the performance estimate.

In one embodiment, the performance estimate can pertain to CPU utilization of the network device. For example, the performance estimate can identify a number of connections per second that the network device can maintain at a given CPU utilization rate.

In one embodiment, the performance estimate can pertain to system throughput of the network device.

In one embodiment, prior to the determining, the one or more performance metrics can be measured and subsequently stored in a memory of the network device.

In one embodiment, the determining can include accessing the one or more performance metrics from the memory.

In one embodiment, the measuring and storing can be performed prior to deployment of the network device.

In one embodiment, the network device can generate a user interface for presenting the performance estimate to a user.

In one embodiment, the network device can be a Layer 4 through 7 application delivery switch.

A further understanding of the nature and advantages of the embodiments disclosed herein can be realized by reference to the remaining portions of the specification and the attached drawings.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

Embodiments of the present invention provide techniques for estimating the performance of a network device when one or more user-configurable/customizable features are enabled on the device. In one set of embodiments, the user-configurable/customizable features can include a user-defined script that is executed via a scripting engine of the network device. When estimating the performance of a network device in view of a user-defined script, the performance estimate can be generated prior to deploying the network device with the script activated/enabled. For example, the performance estimate can be generated at the time of compiling the script on the network device. Thus, users can reasonably predict the performance degradation that will occur due to execution of the script and can plan accordingly. For example, if the performance estimate indicates that device performance will be very low, the script can be modified to reduce its complexity. Alternatively, other accommodations can be made with respect to, e.g., the device's configuration or network capacity to mitigate the estimated performance degradation.

In the sections that follow, several of the described examples and embodiments pertain specifically to estimating the performance of an application delivery switch in view of user-defined scripts that are executed via a scripting engine of the switch. However, it should be appreciated that embodiments of the present invention can be applied to other contexts. For instance, the techniques described herein may be applied to estimating network device performance in view of features that are configured/customized via mechanisms other than user-defined scripts, such as via predefined rules or policies. Further, the techniques described herein may be applied to estimating the performance of network devices other than application delivery switches, such as Layer 2 switches, Layer 3 routers, and so on. One of ordinary skill in the art will recognize many variations, modifications, and alternatives.

Figure 1:
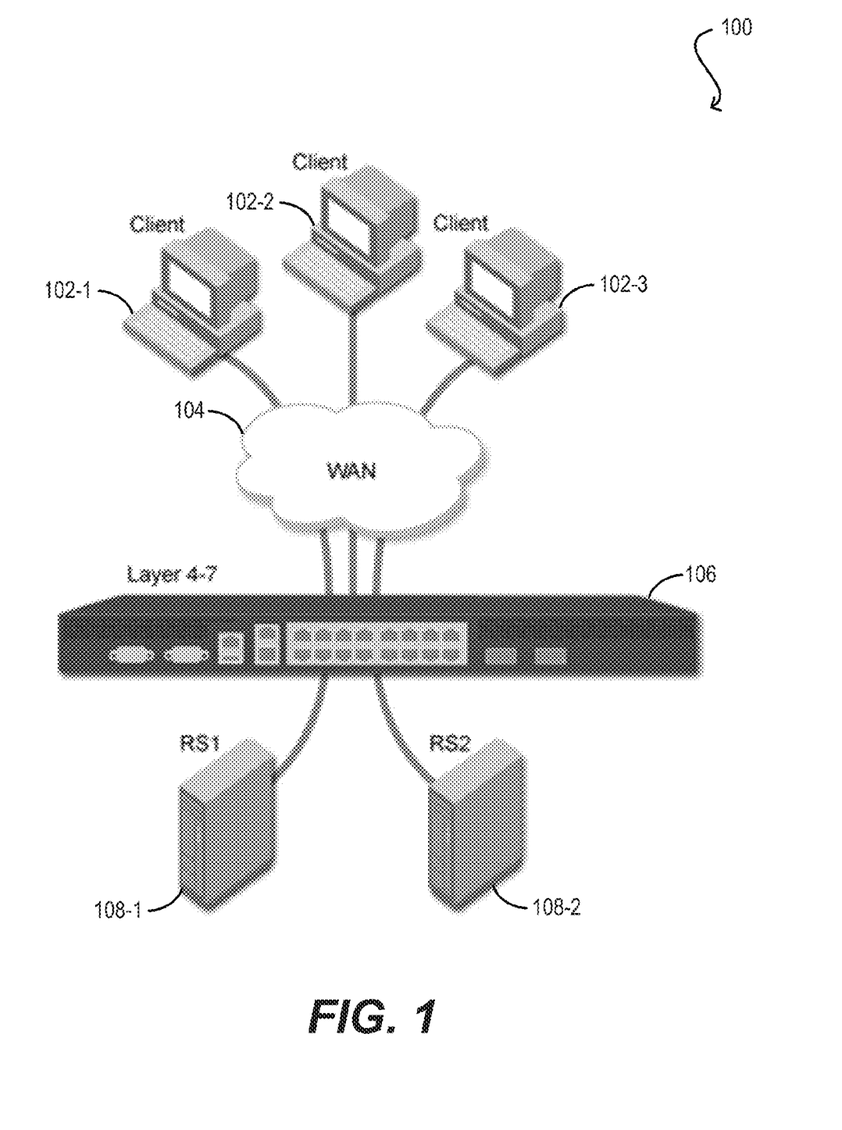
FIG. 1 is a simplified block diagram of a network environment according to an embodiment of the present invention.

FIG. 1 is a simplified block diagram of a network environment 100 according to an embodiment of the present invention. As shown, network environment 100 includes a number of client devices 102-1, 102-2, and 102-3 that are communicatively coupled with application servers 108-1 and 108-2 through a network 104 and a network switch 106. Although FIG. 1 depicts three client devices, two application servers, and one network switch, any number of these entities may be supported.

Client devices 102-1, 102-2, and 102-3 are end-user computing devices, such as a desktop computer, a laptop computer, a personal digital assistant, a smartphone, a tablet, or the like. In one embodiment, client devices 102-1, 102-2, and 102-3 can each execute (via, e.g., a standard web browser or proprietary software) a client component of a distributed software application hosted on application servers 108-1 and/or 108-2, thereby enabling users of devices 102-1, 102-2, and 102-3 to interact with the application.

Application servers 108-1 and 108-2 are computer systems (or clusters/groups of computer systems) that are configured to provide an environment in which the server component of a distributed software application can be executed. For example, application servers 108-1 and 108-2 can receive a request from client 102-1, 102-2, or 102-3 that is directed to an application hosted on the server, process the request using business logic defined for the application, and then generate information responsive to the request for transmission to the client. In embodiments where application servers 108-1 and 108-2 are configured to host one or more web applications, application servers 108-1 and 108-2 can interact with one or more web server systems (not shown). These web server systems can handle the web-specific tasks of receiving Hypertext Transfer Protocol (HTTP) requests from clients 102-1, 102-2, and 102-3 and servicing those requests by returning HTTP responses.

Network switch 106 is a network device that is configured to receive and forward data packets to facilitate delivery of the packets to their intended destinations. In the embodiment of FIG. 1, switch 106 is a Layer 4 through 7 switch (i.e., an application delivery switch or controller), and thus can perform various functions to enhance the delivery of applications that are hosted on application servers 108-1 and 108-2 and consumed by client devices 102-1, 102-2, and 102-3. For instance, switch 106 can intercept and process application data packets transmitted between the application servers and the client devices to provide, e.g., Layer 4 through 7 traffic redirection, server load balancing, automated failover, TCP connection multiplexing, server offload functions (e.g., SSL acceleration and TCP connection management), data compression, network address translation, and more. In certain embodiments, switch 106 can provide integrated Layer 2/3 functionality, in addition to Layer 4 through 7 features.

In a particular embodiment, network switch 106 can incorporate a scripting engine that enables users to create scripts based on IP (Internet Protocol), TCP (Transmission Control Protocol), UDP (User Datagram Protocol), or HTTP (Hypertext Transfer Protocol) protocol events to manipulate packet headers and make custom forwarding decisions. For example, a simple script S1 can perform load balancing to different application servers (e.g., servers 108-1 and 108-2) based on a URL pattern match in an HTTP request sent from a client (e.g., client devices 102-1, 102-2, 102-3).

In addition, network switch 106 can include one or more components that enable switch 106 to estimate its runtime performance when a user-defined script is enabled. For instance, returning to the example of script S1 above, network switch 106 can generate a performance estimate indicate how well (or how poorly) switch 106 will likely perform when script S1 is enabled. In certain embodiments, this performance estimate can be generated prior to deploying network switch 106 with the script S1 activated/enabled. For example, the performance estimate can be generated at the time of compiling script S1 on network switch 106. In this manner, network administrators can have advance warning of the potential performance degradation that will occur due to execution of the script and can plan accordingly. Additional details regarding this performance estimation process are provided in the sections that follow.

It should be appreciated that network environment 100 is illustrative and is not intended to limit embodiments of the present invention. For example, the various entities depicted in network environment 100 can have other capabilities or include other components that are not specifically described. One of ordinary skill in the art will recognize many variations, modifications, and alternatives.

Figure 2:
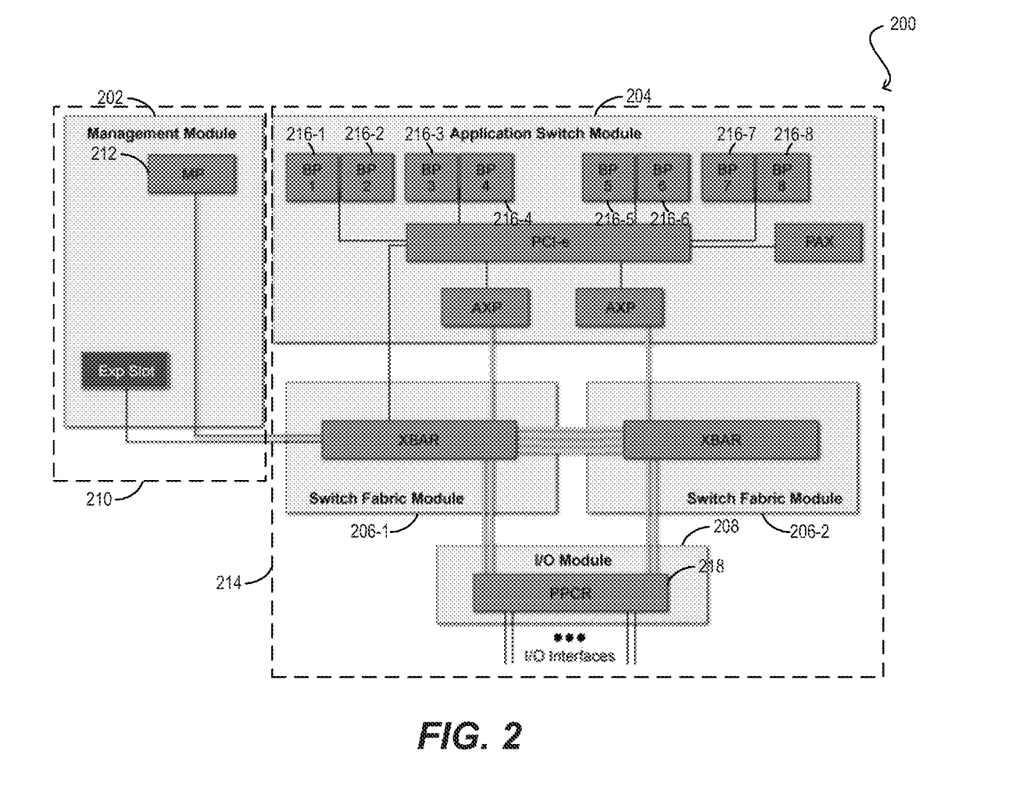
FIG. 2 is a simplified block diagram of a network switch according to an embodiment of the present invention.

FIG. 2 is a simplified block diagram of a network switch 200 according to an embodiment of the present invention. In various embodiments, switch 200 can be used to implement switch 106 in network environment 100 of FIG. 1. In a particular embodiment, switch 200 can be a Layer 4 through 7 application delivery switch provided by Brocade Communications Systems, Inc., such as one of Brocade's Serverfton ADX line of application delivery switches.

As shown in FIG. 2, switch 200 can include a management module 202, an application switch module 204, switch fabric modules 206-1 and 206-2, and an I/O module 208. Although FIG. 2 depicts one management module, one application switch module, two switch fabric modules, and one I/O module, any number of these components can be supported. For example, modules 202, 204, 206-1, 206-2, and 208 can each be implemented as a blade that is insertable into (or removable from) one of a plurality of modular slots in the chassis of switch 200. In this manner, switch 200 can accommodate any number of these modules according to differing network topologies and switching requirements.

Management module 202 represents the control plane (210) of switch 200 and can include one or more management processors 212 that execute the management and/or control functions of switch 200. Management processor 212 can be a general purpose microprocessor, such as a PowerPC, Intel, AMD, or ARM microprocessor, that operates under the control of software stored in an associated memory (not shown).

Application switch module 204, which is part of the data plane (214) of switch 200, can include a number of application cores (e.g., barrel processors) 216-1 to 216-8. Application cores 216-1 to 216-8 are hardware processing components (e.g., field programmable gate arrays (FPGAs)) that are configured to carry out the Layer 4 through 7 application acceleration functions of switch 200.

Switch fabric modules 206-1, 206-2 and I/O module 208 are also part of data plane 214 of switch 200. Switch fabric modules 206-1 and 206-2 are configured to interconnect the various other modules of switch 200. I/O module 208 (also known as a line card) can include one or more input/output ports that are used by switch 200 to send and receive data packets. These ports can send and receive various types of data traffic at different speeds including 1 Gigabit per second, 10 Gigabits per second, 40 Gigabits per second, or 100 Gigabits per second. I/O module 208 can also include one or more packet processors (e.g., PPCR 218). Packet processor 218 is a hardware processing component (e.g., an FPGA) that can make wire speed decisions on how to handle incoming or outgoing data packets. In some embodiments, these decisions can be made in conjunction with information stored in a Content Addressable Memory (CAM) (not shown). One of the decisions that can be made by packet processor 218 is whether a packet needs to be sent to application switch module 204 for Layer 4-7 processing.

It should be appreciated that network switch 200 is illustrative and not intended to limit embodiments of the present invention. Many other configurations having more or fewer components than switch 200 are possible.

Figure 3:
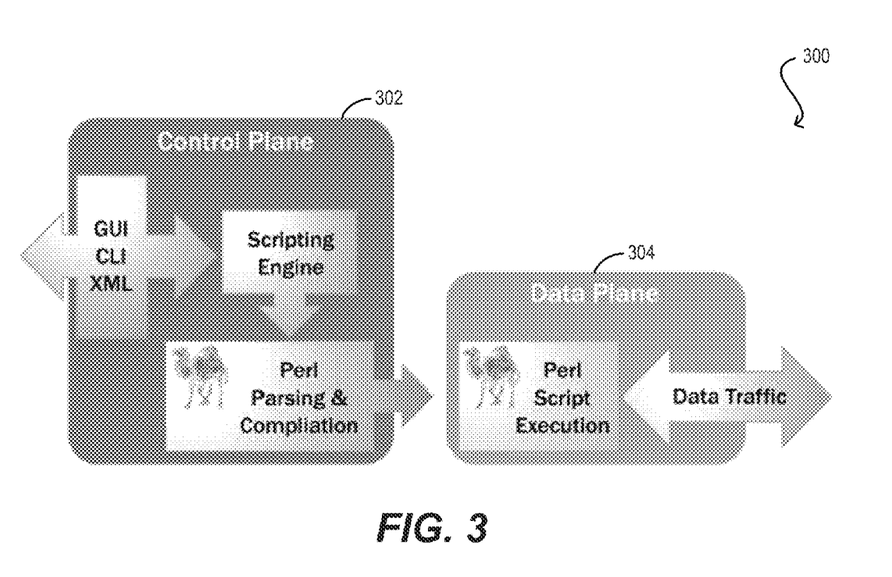
FIG. 3 is a simplified block diagram illustrating a compilation process for a user-defined script according to an embodiment of the present invention.

As noted with respect to FIG. 1, in certain embodiments network switch 106 can incorporate scripting functionality that allows users to create custom application delivery scripts to meet their specific business requirements. FIG. 3 is a block diagram 300 illustrating a process for compiling and executing such scripts on network switch 106 according to an embodiment of the present invention. As shown, diagram 300 depicts a switch control plane 302 and a switch data plane 304. Control plane 302 can correspond to control plane 210 illustrated in FIG. 2, and data plane 304 can correspond to data plane 214 illustrated in FIG. 2.

Generally speaking, the scripts processed by network switch 106 can be written on any platform, and in any scripting language (e.g., Perl, TCL, PHP, Lua, etc.), of a user's choosing. Once a particular script has been written, the script can be uploaded to switch 106 using one of several interfaces (e.g., a graphical user interface (GUI), a command line user interface (CLI), or an XML based interface). The script can then be parsed and compiled by a scripting engine resident in control plane 302. In a particular embodiment, this scripting engine can be implemented in software and executed by management processor 212 of FIG. 2. If the script is successfully compiled, it can be bound to a virtual server and service port of network switch 106. In one embodiment, this binding process can comprise copying byte code for the compiled script to one or more application switch modules of network switch 106 (e.g., module 204 of FIG. 2).

After a script has been compiled and bound, the script can be executed at runtime of network switch 106 in the context of data plane 304. For example, data traffic can be received via the I/O modules (e.g., 208) of network switch 106, and the traffic (or a portion thereof) can be routed to one or more application switch modules 204. Within an application switch module, application cores (e.g., 216-1 through 216-8) can execute the script with respect to the data traffic and manipulate the traffic accordingly. The manipulated packets can then be routed back to one or more I/O modules of network switch 106 for forwarding to their intended destinations.

Figure 4:
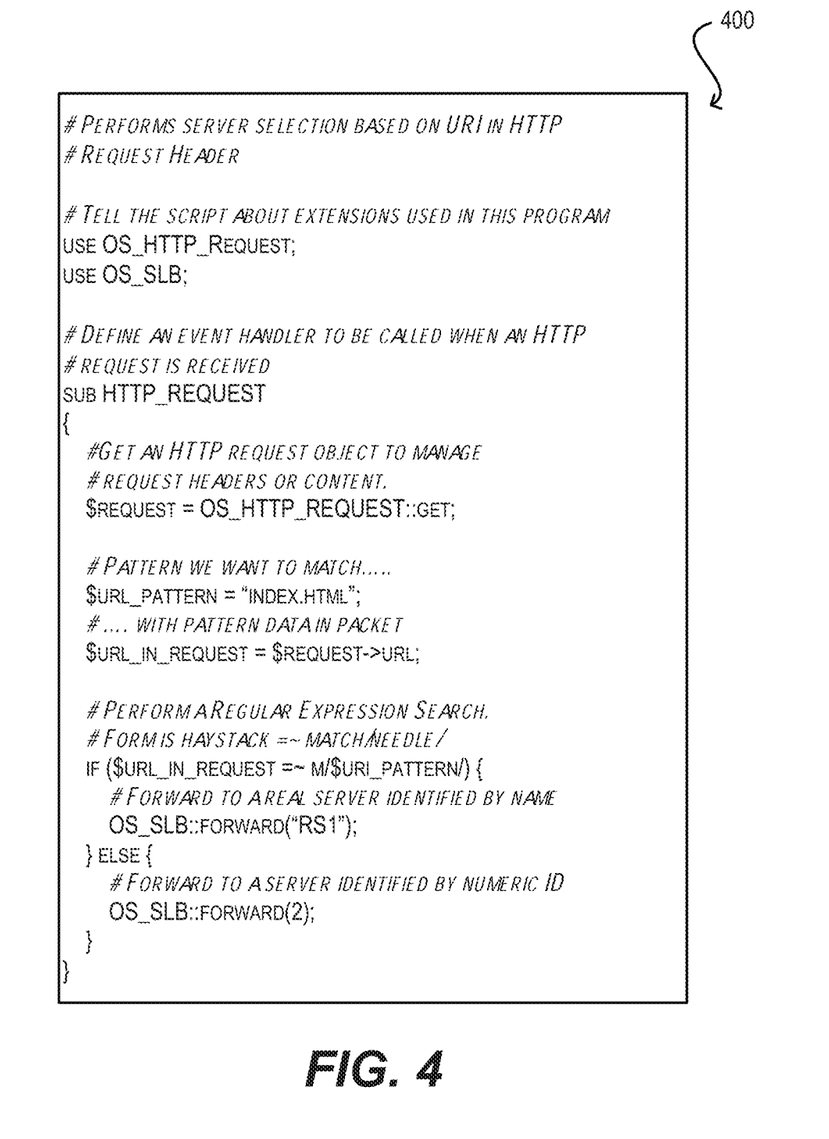
FIG. 4 illustrates an example script according to an embodiment of the present invention.

FIG. 4 illustrates an example script 400 that can be compiled and executed by network switch 106 according to an embodiment of the present invention. In this embodiment, the script is written using the Perl scripting language. However, other scripting languages (e.g., TCL, PHP, Lua, etc.) can also be supported.

As noted in the leading comment, script 400 is configured to perform server selection based on a pattern in the URI of an HTTP request header. To implement this, script 400 first imports two application programming interface (API) extension packages OS_HTTP_REQUEST and OS_SLB. These packages are examples of predefined API libraries that may be exposed by the switch vendor to provide script writers easy access to various functions that would typically be used to customize application delivery (e.g., event handling, content manipulation, server selection, etc.).

Subsequent to the import statements, script 400 includes a subroutine "HTTP_REQUEST" for capturing the HTTP request protocol event. Within this subroutine, script 400 calls the OS_HTTP_REQUEST::get API to obtain a handle to a received HTTP request object. Script 400 then attempts to match the URI in the request object to a particular pattern (i.e., "index.html"). If a match is found, script 400 invokes the OS_SLB::forward API to forward the request to a first application server identified by name "RS1." If no match is found, script 400 invokes the same forwarding API to forward the request to a second application server identified by numeric ID "2."

As noted with respect to FIG. 1, enabling a user-defined script (such as script 400) in network switch 106 can have performance implications for the switch at runtime. For example, a complex script can require a large amount of CPU time, which can cause the overall performance of the switch to fall below an acceptable threshold. To mitigate this, network switch 106 can include a performance estimation feature that enables users to predict the performance of a particular user-defined script, before that script is actually deployed and enabled in a production network environment.

This capability allows users to gain a reasonable understanding of potential performance degradation, and can aid in capacity planning. In a particular embodiment, the performance estimation feature of the present invention can estimate the CPU (i.e., application core) utilization of a user-defined script at the time of compiling the script on network switch 106. This is discussed in further detail with respect to FIGS. 5-7 below.

Figure 5:
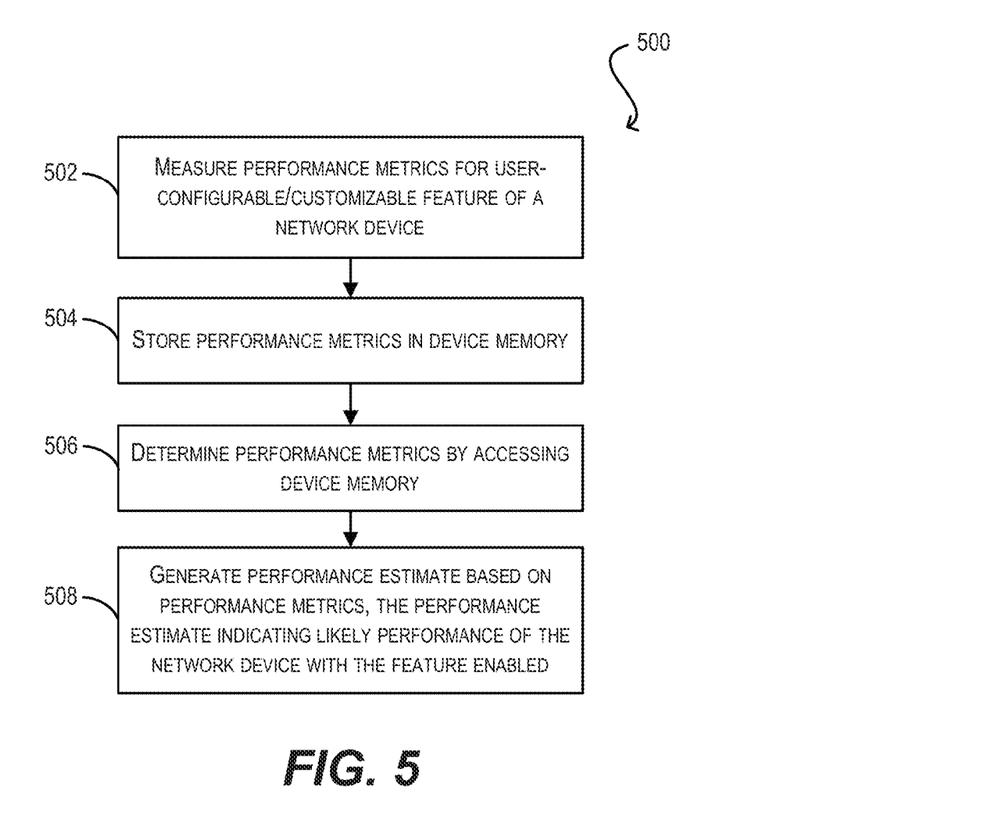
FIG. 5 is a flow diagram of a performance estimation process according to an embodiment of the present invention.

FIG. 5 illustrates a performance estimation process 500 according to an embodiment of the present invention. At block 502, a network device vendor can measure and generate performance metrics for a particular user-configurable/customizable feature of a network device. In one embodiment, this feature may be a predefined application or function (e.g., port security), and may be configurable/customizable via one or more predefined rules or policies that are built into the device. Alternatively, this feature may a user-defined script such as script 400 described with respect to network switch 106 above. In certain embodiments, the measurement process of block 502 may be carried out by the network device vendor during a testing phase that occurs prior to making the network device available to customers.

At block 504, the network device vendor can store the performance metrics that are measured at block 502 in a memory (e.g., system image) of the network device. In this manner, the metrics can be accessible by the network device at a later point in time (e.g., at a customer site). In one embodiment, the performance metrics can be stored in a flat file, such as a header file, within the memory. In other embodiments, the performance metrics can be stored in a structured data format such as a database.

At block 506, the stored performance metrics can be accessed by the network device. The performance metrics can then be used to generate a performance estimate indicating the likely performance of the network device with the user-configurable/customizable feature enabled (block 508). For example, a customer that has purchased the network device may be interested in enabling/customizing the feature in a production environment, but prior to doing so, would like to know (without having to perform extensive testing) what the estimated performance with the feature enabled would be. In this scenario, the customer can provide an appropriate input signal that causes the network device to access the performance metrics stored at block 504. The network device can then use the performance metrics, in conjunction with the particular configuration/options the customer has specified on their network device, to calculate and present a performance estimate for the device (per the customer-specified configuration/customizations). In response, the customer can tweak the configuration of the feature, or perform other modifications (e.g., expand the processing power of the device or add additional devices) to obtain an acceptable level of performance.

Figure 6:
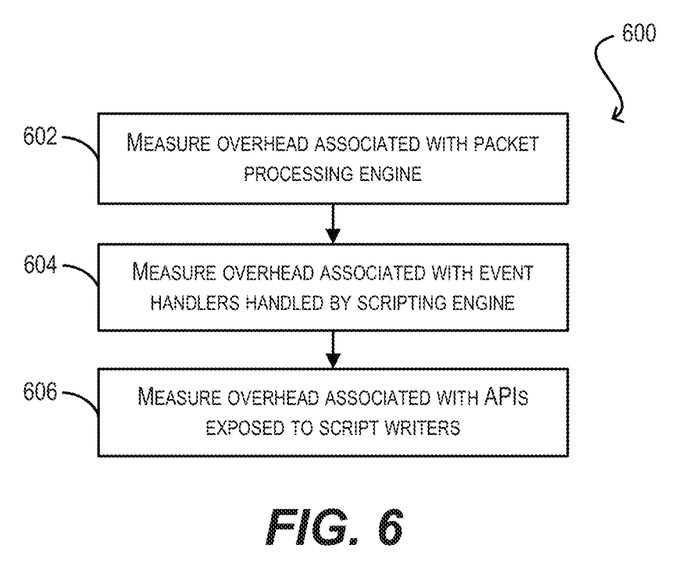
FIG. 6 is a flow diagram of a process for determining performance metrics pertaining to a script according to an embodiment of the present invention.
Figure 7:
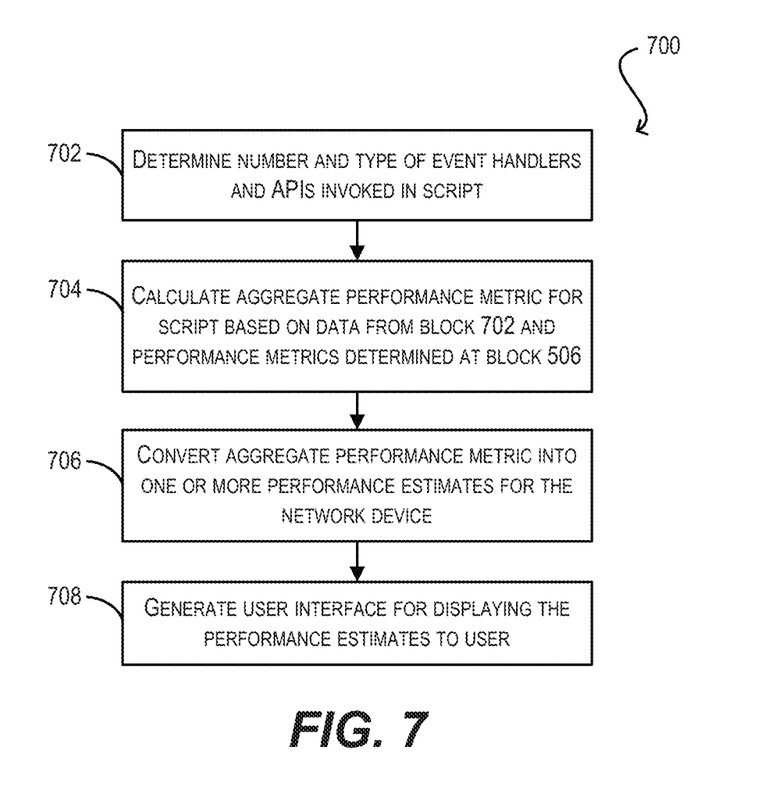
FIG. 7 is a flow diagram of a process for generating a performance estimate based on the performance metrics determined in FIG. 6 according to an embodiment of the present invention.

FIGS. 6 and 7 are further embodiments that illustrate how process 500 of FIG. 5 may be applied to estimating the performance of a network switch (e.g., switch 106 of FIG. 1) with respect to a user-defined script. For example, FIG. 6 illustrates a process 600 for measuring and generating scripting performance metrics according to an embodiment of the present invention. In various embodiments, process 600 can correspond to the processing performed at block 502 of FIG. 5.

At block 602, the switch vendor can measure the overhead associated with the base packet processing engine of switch 106. This can be performed by, e.g., measuring the performance of switch 106 over a typical traffic load without executing any scripts. In one embodiment, the result of this processing can be a CPU utilization value (e.g., in units of CPU cycles) that represents the average CPU overhead of the packet processing engine. In other embodiments, the result of this processing can correspond to any other measure of system load/overhead (e.g., memory utilization, etc.).

At block 604, the switch vendor can measure the overhead associated with the scripting engine of switch 106 for each protocol event that can be handled via a user-defined script. This scripting engine overhead can be measured by executing a test script with event handlers that do not include any logic (i.e., no API invocations or other actions). In one embodiment, the result of this processing can be list of values, where each value in the list corresponds to the overhead for a particular event handler. Like the packet processing overhead determined at block 602, this list of values can correspond to CPU utilization values (e.g., in units of CPU cycles), or any other measure of system load/overhead.

At block 606, the switch vendor can measure the overhead associated with each API that is provided by the switch vendor and that can be invoked by script authors. For example, this can include measuring the overhead associated with the OS_HTTP_REQUEST::get and OS_SLB::forward APIs shown in script 400 of FIG. 4. In one embodiment, to measure the overhead associated with a particular API X, the following code can be used:

```
Sub event_handler {
    $time1 = get system time;
    X( );
    $time2 = get system time;
}
```

With the foregoing measurement code, the overhead of calling API X can be calculated as $time2−$time1. In certain embodiments, a separate measurement script can be created for each API to determine the overhead for that API. In other embodiments, a single measurement script can be created that has a plurality of subroutines as shown above to measure the overhead of every API in a single script run.

Some APIs may require a subsequent action to be performed by the scripting engine after execution of the API. For example, header rewrite APIs can trigger a content rewrite action. In these cases, the overhead associated with these subsequent actions can also be measured and included in the overhead associated with the APIs that trigger the subsequent actions. In one embodiment, subsequent actions can be measured by adding measurement code to the system image of the switch. When a particular API that triggers a subsequent action is invoked, the measurement code in the system image can cause the overhead associated with the subsequent action to be recorded.

Once the packet processing overhead, scripting engine overhead, and API overheads (including subsequent actions) are measured, these performance metrics can be stored in a device memory of switch 106 per block 504 of FIG. 5.

FIG. 7 illustrates a process 700 for generating, by switch 106, a performance estimate for the switch when a user-defined script is enabled according to an embodiment of the present invention. In various embodiments, process 700 can correspond to the processing performed at blocks 506 and 508 of FIG. 5. In a particular embodiment, process 700 can be performed upon compiling the user-defined script via the management plane of switch 106, before the script is active in the data plane.

At block 702, switch 106 can parse the user-defined script and determine the number and type of event handlers and APIs that are invoked in the script. For example, with respect to script 400 of FIG. 4, switch 106 would determine that the script includes one event handler of type "HTTP_REQUEST," one call to API OS_HTTP_REQUEST::get, and one call to API OS_SLB::forward (note that although OS_SLB::forward appears twice in script 400, it would only be invoked once in a given script execution).

At block 704, switch 106 can calculate an aggregate performance metric for the script based on the information determined at block 702, as well as the performance metrics stored in the device memory at block 504 of FIG. 5. In one embodiment, this aggregate performance metric can be calculated by adding together the overhead associated with the switch's packet processing engine, the overhead associated with each event handler in the script, and the overhead associated with each API invocation in the script. For example, if the stored performance metrics indicate that the packet processing engine of switch 106 has an overhead of 500 CPU cycles, the scripting engine has an overhead of 500 CPU cycles for the HTTP_REQUEST event, and APIs OS_HTTP_REQUEST::get and OS_SLB::forward have overheads of 1000 CPU cycles and 2000 CPU cycles respectively, the total overhead for script 400 would be 500+500+1000+2000=4000 CPU cycles.

Once an aggregate performance metric for the script have been calculated, the aggregate performance metric can be converted into one or more performance estimates that are of interest to the end-user (block 706). As one example, the aggregate metric of 4000 CPU cycles can be converted into a certain number of connections per second at a given CPU utilization rate. Other types of performance estimates may also be determined. For instances, in one embodiment, performance estimates may be determined that pertain to system throughput. In another embodiment, performance estimates may be determined that pertain to system scalability (e.g., # of ACLs, # of connections, # of sessions, etc.). In yet another embodiment, performance estimates may be determined that indicate the extent to which certain system performance measures (e.g., CPU utilization, connections/second, etc.) are diminished from a certain base (e.g., normal) level due to execution of the script. One of ordinary skill in the art will recognize many variations, modifications, and alternatives.

Figure 8:
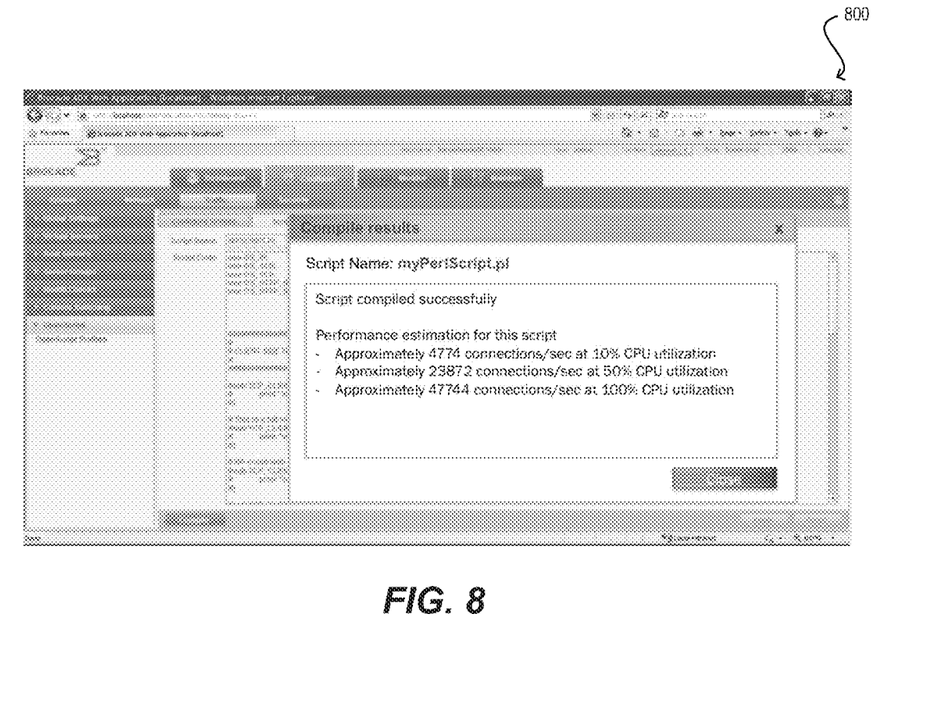
FIG. 8 is an example graphical user interface for reporting a performance estimate according to an embodiment of the present invention.

The performance estimates generated at block 706 can then be displayed via a user interface to the user (block 708). FIG. 8 illustrates one such user interface 800 that shows the number of connections per second that switch 106 can support when running script "myPerlScript.pl" at CPU utilization rates of 10%, 50%, and 100% respectively. In the embodiment of FIG. 8, user interface 800 is configured to report connections per second for a single CPU (i.e., application core) of switch 106. Further, these performance estimates assume that only a single script (i.e., "myPerlScript.pl") is running on the switch. In alternative embodiments, the generated performance estimates can take into account the number of application cores installed in the switch, as well as the total performance degradation caused by multiple user-defined scripts running in parallel.

In addition to displaying the performance estimates to a user per FIG. 8, in some embodiments switch 106 can take certain automated actions in response to the calculated estimates. For example, in one embodiment, switch 106 can prevent the execution of the script if the performance estimates fall below a predefined threshold. In another embodiment, switch 106 can automatically analyze the script and provide recommendations for modifying the script to improve its performance.

In certain embodiments, a portion of the processing described with respect to FIGS. 5-7 can be carried out by a computing device or system than is distinct from the network device whose performance is being estimated. For instance, in a particular embodiment, the performance estimator feature can be exposed to users via an online/web-based application (rather than via the network device itself). In this embodiment, the process of generating a network device performance estimate can be carried out by an application server that is configured to host the online/web-based application.

By way of example, upon measuring performance metrics for a user-configurable/customizable feature of a network device at block 502 of FIG. 5, the performance metrics can be stored in a database or other type of data store accessible to the application server (rather than in a device memory of the network device per block 504). The database can store performance metrics for a plurality of different network device models/configurations. At application runtime, the application server can generate one or more client-side user interfaces for receiving a selection of a network device model and a user-defined script from a user.

In response to receiving a selection of a network device and a user-defined script, the application server can execute a script parsing component to determine the components of the script (e.g., number and type of event handlers, number and type of API invocations, etc.). Further, the application server can access performance metrics for the network device as stored in the database. The application server can then calculate, based on the script information and the retrieved performance metrics, a performance estimate for the network device with the script activated. In one embodiment, these steps can be substantially similar to the processing described with respect to blocks 702-708 of FIG. 7.

Once the performance estimate has been calculated, the application server can generate a user interface (e.g., user interface 800) for presenting the performance estimate to the user. In certain embodiments, the application server can also perform one or more other actions based on the performance estimate, such as automatically determining a modified version of the script (with performance enhancements), or providing a recommendation to run the script on a differently configured (e.g., more powerful) network device.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A method comprising:
    determining, by a network device, one or more performance metrics associated with a scripting engine of the network device;
    parsing, by the network device, a user-defined script to determine the user-defined script's content; and
    generating, by the network device based on the content of the user-defined script and the one or more performance metrics, a performance estimate for the network device in view of the user-defined script, the performance estimate indicating likely performance of the network device when the user-defined script is executed via the scripting engine.

2. The method of claim 1 wherein the determining, parsing, and generating are performed at a time of compiling the user-defined script on the network device.

3. The method of claim 1 wherein the one or more performance metrics include a performance overhead value for a packet processing engine of the network device.

4. The method of claim 3 wherein the one or more performance metrics further include:
    a performance overhead value for each of a plurality of event handlers; and
    a performance overhead value for each of a plurality of application programming interfaces (APIs).

5. The method of claim 4 wherein generating the performance estimate comprises:
    identifying one or more event handlers in the plurality of event handlers that are included in the user-defined script;
    identifying one or more APIs in the plurality of APIs that are invoked in the user-defined script; and
    generating an aggregate performance metric for the user-defined script by aggregating the performance overhead value for the packet processing engine, the performance overhead values for each of the one or more event handlers, and the performance overhead values for each of the one or more APIs.

6. The method of claim 5 wherein generating the performance estimate further comprises converting the aggregate performance metric into the performance estimate.

7. The method of claim 1 where the performance estimate pertains to CPU utilization of the network device.

8. The method of claim 7 wherein the performance estimate identifies a number of connections per second that the network device can maintain at a given CPU utilization rate.

9. The method of claim 1 wherein the performance estimate pertains to system throughput of the network device.

10. The method of claim 1 further comprising, prior to the determining:
    measuring the one or more performance metrics; and
    storing the one or more performance metrics in a memory of the network device.

11. The method of claim 10 wherein the determining comprises accessing the one or more performance metrics from the memory.

12. The method of claim 10 wherein the measuring and storing are performed prior to deployment of the network device.

13. The method of claim 1 further comprising generating a user interface for presenting the performance estimate to a user.

14. A computing device comprising:
    a processor; and
    a memory having stored therein program code executable by the processor, the program code causing the processor to:
        determine one or more performance metrics associated with a scripting engine of the computing device;
        parse a user-defined script to determine the user-defined script's content; and
        generate, based on the content of the user-defined script and the one or more performance metrics, a performance estimate for the computing device in view of the user-defined script, the performance estimate indicating likely performance of the computing device when the user-defined script is executed via the scripting engine.

15. The computing device of claim 14 wherein the computing device is a network device.

16. The computing device of claim 15 wherein the computing device is a Layer 4 through 7 switch.

17. A non-transitory computer readable storage medium having stored thereon program code executable by a computing device, the program code comprising:
    code that causes the computing device to determine one or more performance metrics associated with a scripting engine of the computing device;
    code that causes the computing device to parse a user-defined script to determine the user-defined script's content; and
    code that causes the computing device to, based on the content of the user-defined script and the one or more performance metrics, generate a performance estimate for the computing device in view of the user-defined script, the performance estimate indicating likely performance of the computing device when the user-defined script is executed via the scripting engine.

18. A method comprising:
    determining, by a computing device, one or more performance metrics associated with a scripting engine of the computing device;
    parsing, by the computing device, a user-defined script to determine the user-defined script's content; and
    generating, by the computing device based on the content of the user-defined script and the one or more performance metrics, a performance estimate for the computing device in view of the user-defined script, the performance estimate indicating likely performance of the computing device when the user-defined script is executed via the scripting engine.

* * * * *